US008563063B2

(12) United States Patent
Avey et al.

(10) Patent No.: US 8,563,063 B2
(45) Date of Patent: Oct. 22, 2013

(54) MELON PEELER SYSTEMS

(76) Inventors: Jerry Avey, Longmont, CO (US);
Donna Avey, Longmont, CO (US)

( * ) Notice: Subject to any disclaimer, the term of this patent is extended or adjusted under 35 U.S.C. 154(b) by 284 days.

(21) Appl. No.: 13/192,459

(22) Filed: Jul. 28, 2011

(65) Prior Publication Data

US 2012/0034359 A1 Feb. 9, 2012

Related U.S. Application Data (60) Provisional application No. 61/401,130, filed on Aug. 9, 2010.

(51) Int. Cl.
*A23N 7/00* (2006.01)
*A23L 1/212* (2006.01)

(52) U.S. Cl.
USPC ............... 426/482; 426/483; 99/540; 99/541; 99/589; 99/590; 99/584

(58) Field of Classification Search
USPC ............ 426/482, 483; 99/540, 541, 589, 590, 99/584
See application file for complete search history.

(56) References Cited

U.S. PATENT DOCUMENTS

| | | | |
|---|---|---|---|
| 4,318,339 A | 3/1982 | Sage | |
| 5,598,773 A | 2/1997 | Hoffseth | |
| 5,660,104 A * | 8/1997 | Heinzen et al. | 99/595 |
| 5,664,490 A | 9/1997 | Tompkins et al. | |
| 5,806,414 A * | 9/1998 | Heinzen et al. | 99/591 |
| 5,937,524 A * | 8/1999 | Hornsby | 30/113.1 |
| 6,116,155 A | 9/2000 | Harding | |
| 6,748,854 B2 * | 6/2004 | Barnard | 99/541 |
| 7,568,414 B2 * | 8/2009 | Farid et al. | 83/435.19 |
| 8,272,631 B2 * | 9/2012 | Gannon | 269/90 |
| 2004/0117991 A1 | 6/2004 | Haberstroh | |
| 2010/0031831 A1 * | 2/2010 | Farid et al. | 99/541 |
| 2010/0043240 A1 * | 2/2010 | Balian | 30/307 |
| 2011/0296695 A1 * | 12/2011 | Temiz | 30/302 |

FOREIGN PATENT DOCUMENTS

| | | | |
|---|---|---|---|
| CA | 2323134 | * | 4/2002 |
| CN | 2853333 | * | 1/2007 |
| CN | 201349947 | * | 11/2009 |
| CN | 201361902 | * | 12/2009 |
| CN | 201376290 | * | 1/2010 |
| DE | 102007026642 | * | 12/2008 |
| FR | 2681512 | * | 3/1993 |

* cited by examiner

*Primary Examiner* — Anthony Weier
(74) *Attorney, Agent, or Firm* — RG Patent Consulting, LLC; Rachel Gilboy (57) ABSTRACT

A melon peeler system designed to safely and quickly separate the rind from a melon for consumption. The melon peeler system includes a melon peeler assembly having a concave base, a horizontal blade, fasteners, and vertical supports. The concave base has a smooth surface and serves as a melon cutting guide. The horizontal blade is supported a user-determined distance above the concave base by the vertical supports and the blade is a small, flat cutting edge sufficiently sharp to slice through a melon but not sufficiently sharp to easily cut a user. Suction cups fasteners located on the bottom of the device provide stability and allow the assembly to be removably affixed to a planar surface of the user's choice.

20 Claims, 6 Drawing Sheets

MELON PEELER SYSTEMS

CROSS-REFERENCE TO RELATED APPLICATION

The present application is related to and claims priority from prior provisional application Ser. No. 61/401,130, filed Aug. 9, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of peeling devices and more specifically relates to melon peelers.

2. Description of the Related Art

Many individuals enjoy the taste of melons and include them in their diet(s). Prior to consuming melons an individual typically removes the rind using a knife to access the fleshy interior. This cutting act is often achieved by running a sharp knife between the rind and the flesh of the fruit and then slicing through the fruit by pulling the knife toward the user's body. Cutting motions such as this may prove dangerous. Knives may also be used in conjunction with cutting boards; however much of the fruit may be wasted by cutting using a knife.

A second option for preparing melons for consumption involves use of a peeler (normally either a potato peeler or an apple peeler.) Peelers traditionally comprise a metal blade attached to a wooden, metal or plastic handle. They may be used, through skillful manipulation, to remove the outer skin or peel. The peeling action normally involves using the fingers of the right hand (provided the individual is right-handed) to pull the peeler's blade over the skin of the melon, turning the blade slightly so that it digs in and removes the skin, in a movement towards the right thumb. Other peelers, such as Y-peelers, may be used in a similar manner to a razor, shaving off strips parallel to the handle. For safety reasons, when a peeler is used to peel an item held in the hands, the blade should be kept still, and the item pushed against it. In certain circumstances the outer peel or rind may be difficult to pierce, thus a user may have to begin the cutting operation with a knife and finish using the peeler. It is desirable that a single device be used to remove the rind from the fruit before consumption and that any cutting be accomplished in a safe manner.

Various attempts have been made to solve the above-mentioned problems such as those found in U.S. Pat. Nos. 6,116,155, 5,664,490, 4,318,339, 5,598,773, 5,660,104, and 2004/0117991. This prior art is representative of fruit and/or vegetable peeling means. None of the above inventions and patents, taken either singly or in combination, is seen to describe the invention as claimed.

Ideally, a melon peeling device should be safe and efficient in use, user-friendly and require little maintenance, yet would operate reliably and be manufactured at a modest expense. Thus, a need exists for a reliable melon peeler system to safely and quickly separate the rind from a melon such that the fruit is ready for consumption and to avoid the above-mentioned problems.

BRIEF SUMMARY OF THE INVENTION

In view of the foregoing disadvantages inherent in the known melon peeler art, the present invention provides a novel melon peeler system. The general purpose of the present invention, which will be described subsequently in greater detail is to provide a reliable manually-operated melon peeler system to safely and quickly separate the rind from a melon.

The present invention, melon peeler systems, as disclosed herein, preferably comprises: a melon peeler assembly having, a concave base, at least one horizontal blade, at least one fastener, and vertical supports. The concave base, in preferred embodiments, comprises a smooth surface and serves as a melon cutting guide upon which the fruit may efficiently slide during the cutting action. The horizontal blade is suitably supported a user-determined distance above the concave base by the vertical supports.

The horizontal blade is horizontally-oriented within and via the vertical supports (in relation to the concave base) and is vertically adjustable (distance-wise) from the concave base within the vertical supports. The vertical adjustment may be accomplished by moving the blade up or down in the notches provided. The blade in these embodiments preferably comprises stainless steel (although other suitable materials may be used), and has a small, flat cutting edge sufficiently sharp to slice through a melon but not sufficiently sharp to easily cut a user. This feature provides that the device is substantially safe in use. In this way the horizontal blade of the melon peeler assembly is usable to cut the flesh of the melon from the rind for consumption. After the rind is removed from the flesh, strips and shapes of the melon at desired thicknesses may be created using the present invention, the melon flesh being used to form at least one aesthetic comestible.

Referring back to the various components in the preferred embodiment(s), the vertical supports, as mentioned may comprise a plurality of notches that define a parallel distance of the horizontal blade from a planar surface (and consequently from the concave base.) The vertical supports are employed to frictionally support the horizontal blade within the notches via suitable attachment means. The blade is preferably inserted through the notches such that forward or backward movement does not affect the positioning of the blade. The notches provide an efficient and effective means for selecting a user-determined distance whereby the user-determined distance of the horizontal blade may be increased or decreased relative to and fro the concave base. The distance between the horizontal blade and the concave base may determine a 'peel thickness' of the rind when removed from the flesh of the melon. Further, the distance between the horizontal blade and the concave base, as determined by placement of the horizontal blade in the notches, may allow different size wedges of the melon to be cut during a cutting action. Another cutting action may include further slicing the melon into hors d'oeuvres (or other shapes) after the rind has been removed.

Fastener may be used to hold the present invention stationary to a work-surface. In preferred embodiments these fasteners may comprise suction cup(s) and are removable with relative ease from the planar (work) surface. The suction cups are used to provide stability such that the melon peeler assembly may be securely affixed to at least one planar surface, then removed, when desired for cleaning and storage. The device may be repeatedly affixed and re-affixed to the same planar surface or to another planar surface. For purposes of this disclosure the planar surface may comprise a table surface or a countertop or the like.

The guide, as referred to herein is integral with the concave base; the concave base conforms to an outer curvature (spherical) of the melon such that a uniform cutting action is accomplished when the melon peeler assembly receives a wedge of the melon pushed by the user into cutting contact with the horizontal blade. The wedge of the melon (including the rind and the flesh) is separable by the horizontal blade, leaving the fruit ready to eat when completed and the rind able to be discarded. The wedge of the melon when being cut is preferably oriented with the outer surface of the rind facing downwardly and the flesh facing upwardly. The wedge of the melon is pushed against and then pulled across the horizontal blade separating the rind from the flesh in one pass.

A kit is embodied herein for the melon peeler systems preferably comprising: the melon peeler assembly; a tiered fruit arrangement and display assembly; and at least one skewer holder. The tiered fruit arrangement and display assembly may include at least one large platter and at least one small platter that may be oriented in relation to each other to display the fruit in an attractive and appetizing manner. The tiered fruit arrangement and display assembly, and at least one skewer holder are suitable for displayably-holding melon hors d'oeuvres cut by the melon peeler assembly.

In accordance with the embodiments of the present invention a preferred method of use is disclosed herein preferably comprising the steps of: severing a melon into wedges; manually cutting at least one wedge of the melon using a melon peeler assembly, (the wedge of the melon oriented with the rind side facing downwardly and a flesh side facing upwardly), wherein the cutting is accomplished using the horizontal blade, the wedge of the melon is push-moved along an arc on a guide surface on the concave base of the melon peeler assembly, the wedge coming into cutting contact with the horizontal blade, the blade then passing between the rind and the flesh (while being push- and pull-moved respectively by the user) to cut the melon, thereby removing the rind side from the flesh side; next slicing the flesh into melon hors d'oeuvres; and finally arranging the melon hors d'oeuvres within the tiered fruit arrangement and display assembly and/or on the skewer holder(s), the melon hors d'oeuvres forming an aesthetic comestible for consumption.

The present invention holds significant improvements and serves as a melon peeler system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, melon peeler system(s), constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a peeler device and more particularly to a novel manual melon peeler as used to safely and quickly separate the rind from a melon for consumption and/or for further cutting manipulations.

Figure 1:
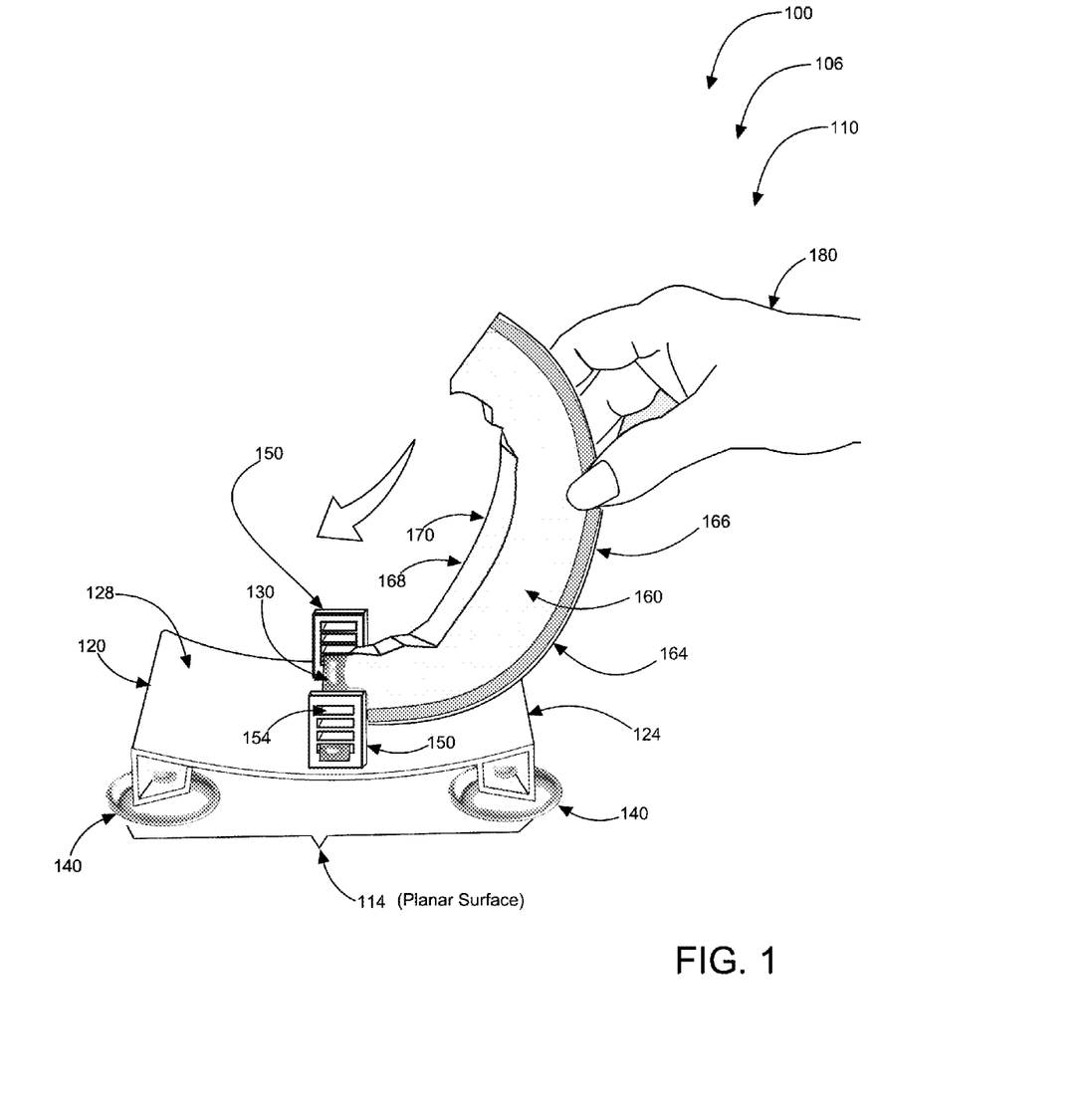
FIG. 1 shows a perspective view illustrating a melon peeler assembly of a melon peeler system in an 'in-use' condition (a user beginning a peeling action to separate a rind from a flesh of a melon wedge via a pushing action) according to an embodiment of the present invention.
Figure 2:
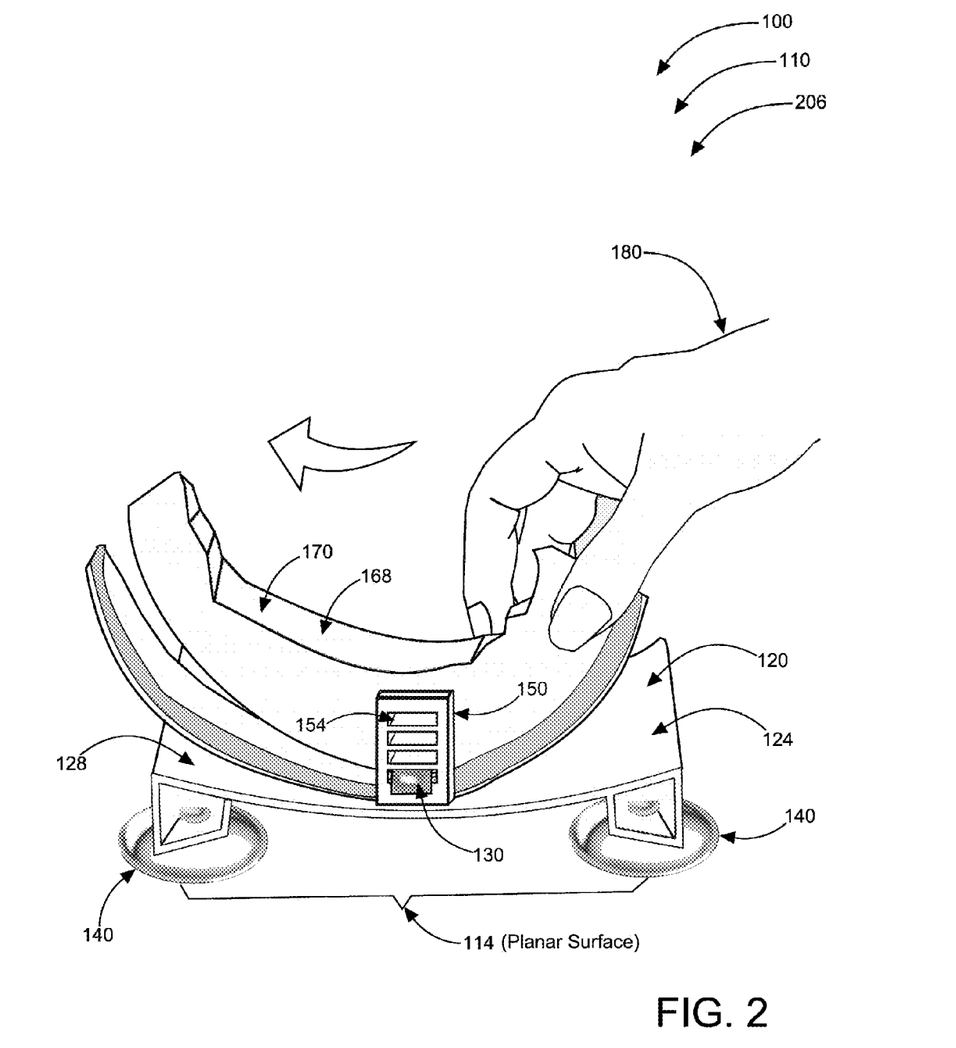
FIG. 2 shows a perspective view illustrating the melon peeler assembly of the melon peeler system (the user continuing to peel the rind from the flesh via a pushing action) in the 'in-use' condition according to an embodiment of the present invention of FIG. 1.
Figure 3:
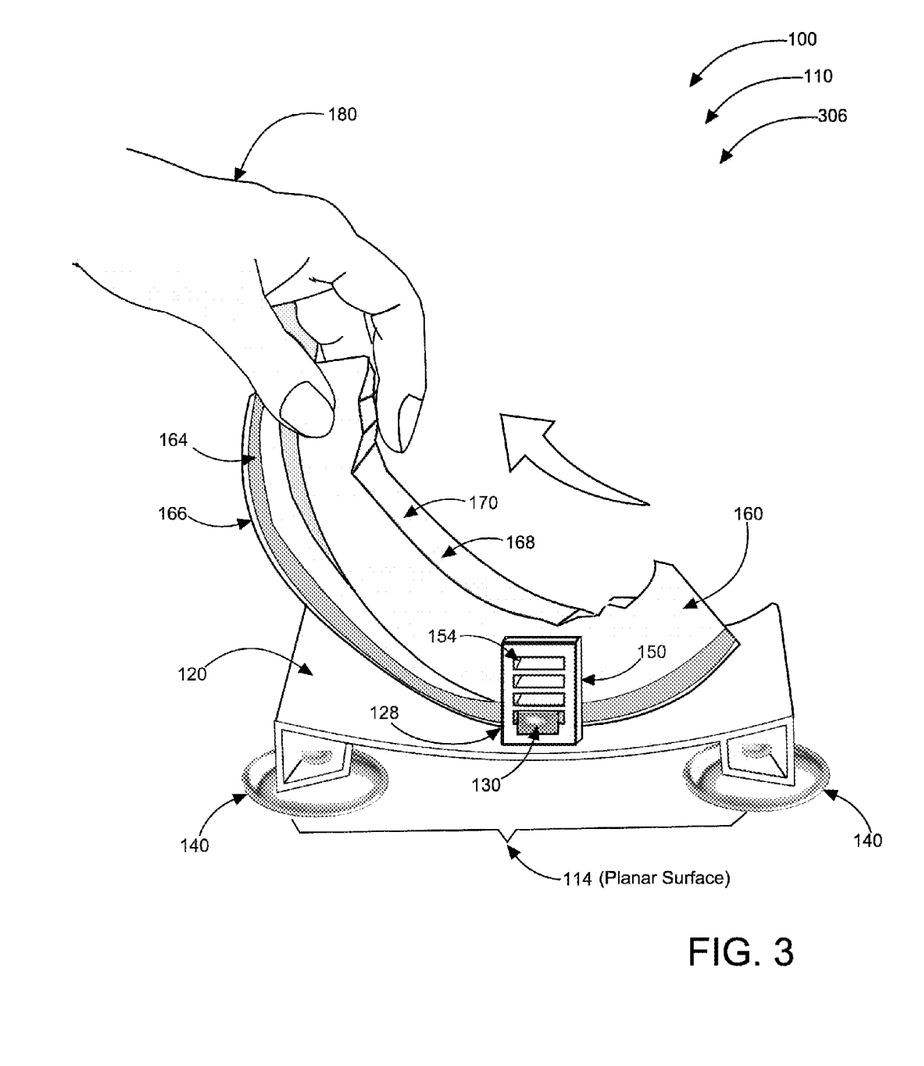
FIG. 3 shows a perspective view illustrating the melon peeler system being used to complete the peeling action of the melon wedge using a pulling action during the in-use condition according to an embodiment of the present invention of FIGS. 1 and 2.

Referring now to the drawings by numerals of reference FIGS. 1-3 show perspective views of melon peeler system 100 in 'in-use' condition 106, 206, and 306, respectively, as a cut (peeling action) progresses from a push to a pull manipulation, whereby melon 160 is prepared for consumption in a safe and efficient manner. Melons 160 for the purposes of the present disclosure may include various culinary vegetables, members of the plant family Cucurbitaceae including watermelons, cantaloupe, honeydew, horned, muskmelons and the like.

Melon peeler system(s) 100 preferably comprises melon peeler assembly 110, as shown in FIGS. 1-3. Melon peeler assembly 110 is designed to safely and quickly separate rind 164 from flesh 168 of melon 160. Rind 164 of melon 160 preferably has rind side 166 (being removed to be discarded), while flesh 168 (the edible portion) preferably has flesh side 170 (being retained). The present figures are used to illustrate how user 180 progresses from a push action to a pull action to manually separate rind 164 from flesh 168 of melon 160.

Melon peeler assembly 110 may be used to separate rind 164 from melon 160 such as watermelon, cantaloupe, or muskmelon, however it should be appreciated that other melons or fruits having rinds may be cut/carved using melon peeler assembly 110. Melon peeler assembly 110 within this particular embodiment preferably includes concave base 120, at least one horizontal blade 130 (more may be used if desired), at least one fastener 140, and vertical supports 150 (vertical supports 150 having a plurality of notches 154.) To separate rind 164 from flesh 168 of melon 160, user 180 may begin by pushing and continue to slide melon 160 across horizontal blade 130 of melon peeler assembly 110 to cut flesh 168 of melon 160. After rind 164 is successfully removed from flesh 168, strips and shapes of flesh 168 of melon 160 at desired thicknesses may be created (such as those displayed in FIGS. 4 & 5.)

Concave base 120 preferably comprises smooth surface 124 and serves as guide 128. Smooth surface 124 effectively enables melon 160 to be efficiently and continuously 'guided' along concave base 120 during the entire cutting action. Guide 128 of concave base 120 comprises a surface (at least herein enabling smooth surface 124) that conforms to an outer curvature of melon 160 such that a uniform cutting action is able to be accomplished, separating rind 164 from flesh 168 of melon 160, as melon 160 is pushed against and then pulled across horizontal blade 130. This feature provides that an even and consistent peel is achieved thereby preserving the maximum amount of the fruit and minimizing the amount of flesh 168 left on rind 164. In this way the present invention serves to minimize waste.

Horizontal blade 130 is preferably suitably supported a user-determined distance above concave base 120. Further, horizontal blade 130 may be adjustable and preferably comprises stainless steel, however it should be appreciated that other suitable comestible-friendly materials such as plastic may be used. Concave base 120 in this particular embodiment preferably comprises plastic, thereby providing a cost-efficient manufacture, a food-friendly surface that doesn't contaminate the fruit being cut, and a lightweight device that is relatively easy to clean and store. Upon reading this specification, it should be appreciated that, under appropriate circumstances, considering such issues as user preferences, design preference, structural requirements, marketing preferences, cost, available materials, technological advances, etc., other materials such as, for example, stainless steel, composite, etc., may be sufficient.

Melon peeler assembly 110 is designed to receive melon 160 pre-cut into wedge(s) 162. Wedge(s) 162 may be initially pushed by user 180 (hand of user 180 shown) into cutting contact with horizontal blade 130 with melon 160 being oriented with rind side 166 facing downwardly and flesh side 170 facing upwardly as shown in 'in-use' condition 106 of FIG. 1, 'in-use' condition 206 in FIG. 2, and 'in-use' condition 306 in FIG. 3. Thus, wedge 162 of melon 160 is able to be pushed against and pulled across horizontal blade 130 to separate rind 164 from flesh 168.

In-use' condition 106 of FIG. 1 illustrates user 180 pushing wedge 162 of melon 160 against horizontal blade 130, to begin the cutting action, causing flesh 168 of melon 160 to ultimately be separated from rind 164. In a similar, yet continuing motion, 'In-use' conditions 206 as shown in FIG. 2 illustrates wedge 162 of melon 160 being pushed toward center portion 134 of horizontal blade 130 to create and continue a sheering/cutting action upon wedge 162. Lastly, in-use' condition 306 of FIG. 3 illustrates user 180 pulling wedge 162 (grasping on the opposite side of wedge 162) continuing the forward movement illustrated by the relative motion indicating arrow(s) through horizontal blade 130 to complete the cutting action to fully remove rind 164 from flesh 168. User 180 may switch between pushing and pulling manipulations using one or both hands, however use of both hands is conducive to a continuous cutting action, thus is preferred.

The distance between horizontal blade 130 and concave base 120 may determine a 'peel thickness' of rind 164 when removed from flesh 168. The distance between horizontal blade 130 and concave base 120 may be determined by placement of horizontal blade 130 in notches 154, as described previously. As such, the varying distance between horizontal blade 130 and concave base 120 allows for different sizes of wedge 162 of melon 160 to be cut during the cutting action. It should also be appreciated that more than one horizontal blade 130 may be used if desired within alternate embodiments. Vertical supports 150 support/secure horizontal blade 130 within notches 154. Thus, notches 154 provide a means for selecting a user-determined distance whereby horizontal blade 130 may be increased or decreased in distance relative to concave base 120, as per application and/or user preference.

Fastener(s) 140 of melon peeler assembly 110 are preferably removable and are used to provide stability, when attached, such that melon peeler assembly 110 may be securely affixable to one or more planar surface(s) 114. Fastener(s) 140 preferably comprises suction cup(s), with the preferred number of suction cup(s) being four thereby adding to the stability of melon peeler assembly 110 when in 'in-use' condition(s) 106, 206, and 306 respectively. Planar surface 114 may comprise either a table surface or a countertop. Planar surface 114 may comprise other like surfaces that may be suitable for cutting melon 160.

Figure 4:
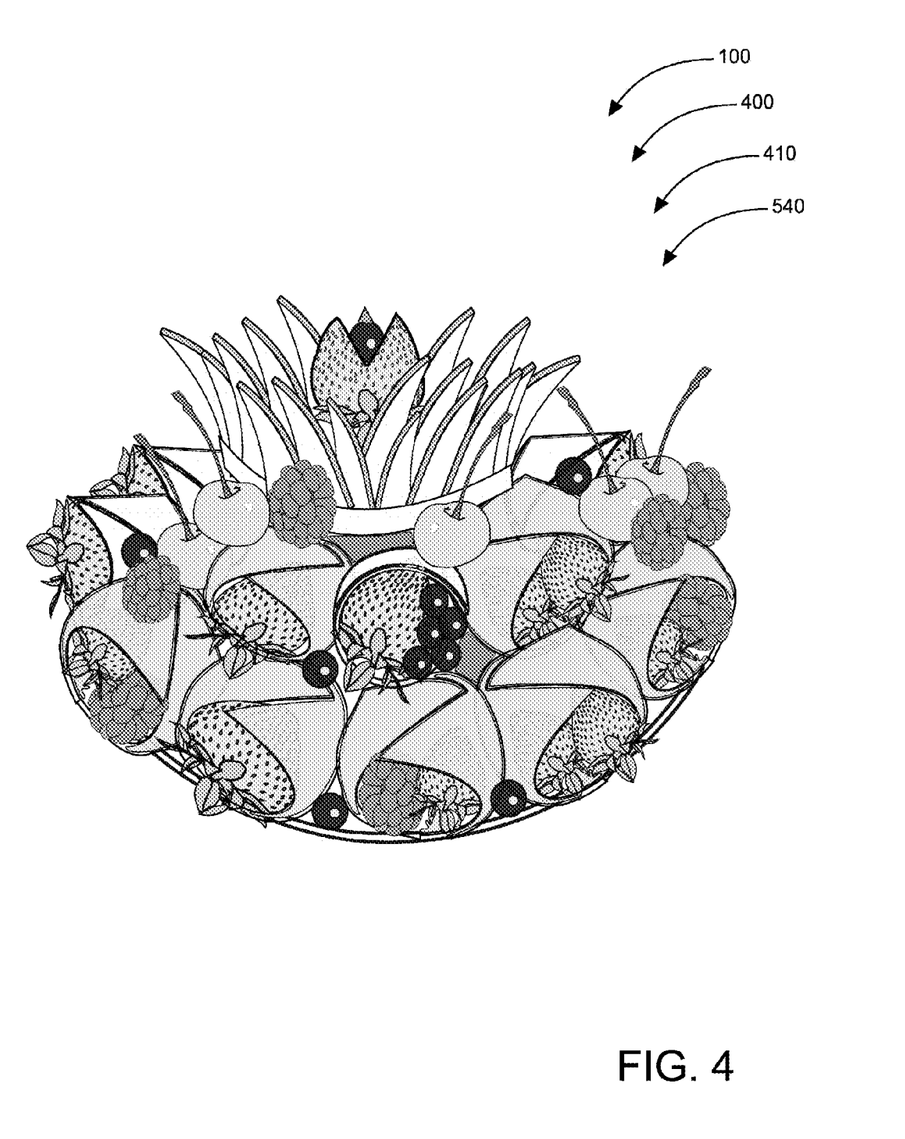
FIG. 4 shows a perspective view illustrating a large platter of fruit hors d'oeuvres as peeled by the melon peeler assembly and displayed via a tiered fruit arrangement and display assembly, both assemblies of the melon peeler system according to an embodiment of the present invention.
Figure 5:
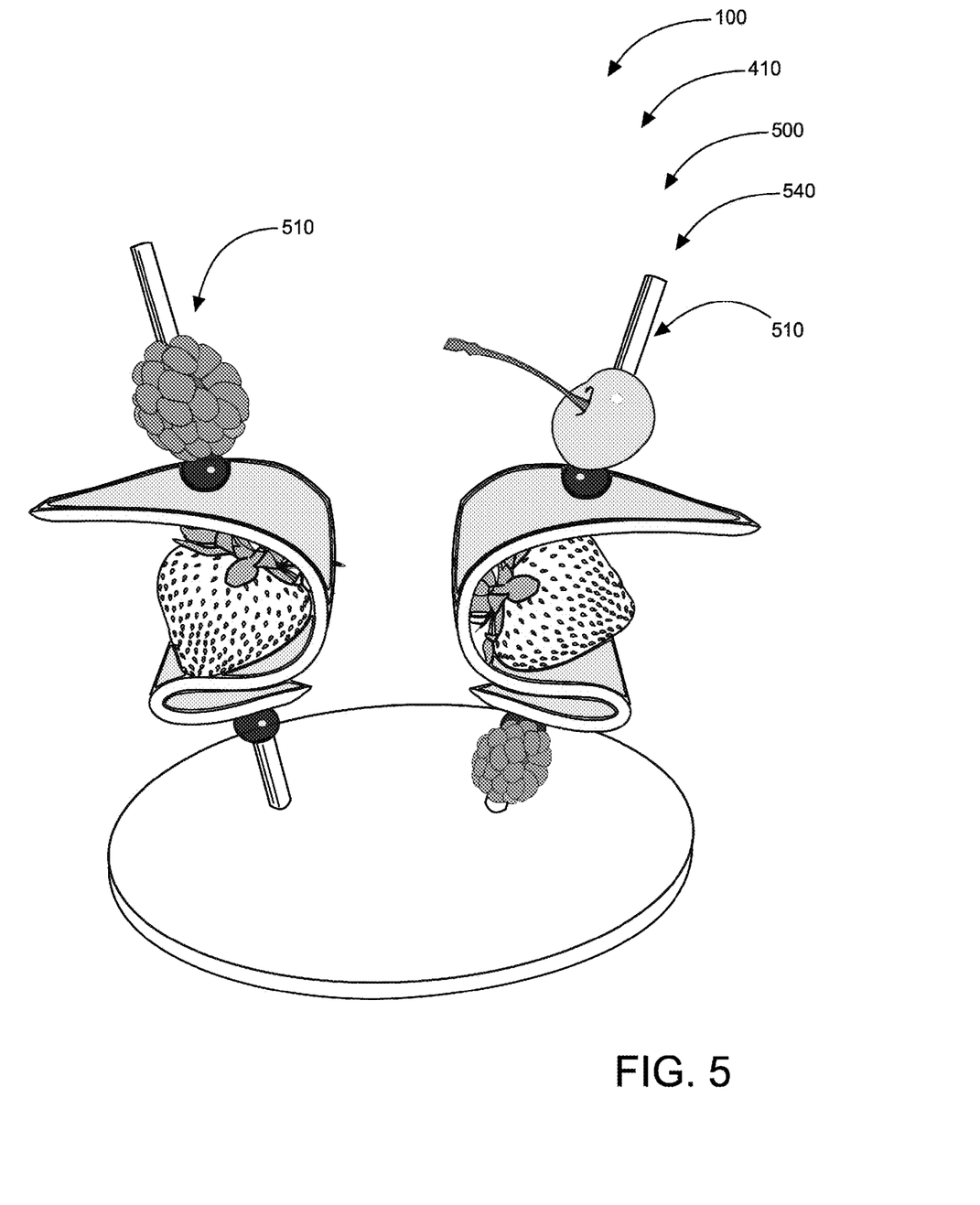
FIG. 5 shows a shows a perspective view illustrating a skewer holder of the melon peeler system being used to hold and aesthetically display the (melon) fruit hors d'oeuvres according to an embodiment of the present invention

Referring now to FIGS. 4-5 (as relating to FIG. 6) showing perspective views illustrating display means for fruit hors d'oeuvres of melon 160 using the present invention, melon peeler system 110 according to preferred embodiments as described herein. Melon peeler systems 100 may be used to create a large platter of fruit hors d'oeuvres 400 in the form of tiered fruit arrangement and display assembly 410 as shown in FIG. 4 and/or skewer holder 510 holding and displaying fruit hors d'oeuvres 500 as shown in FIG. 5. (FIG. 6 shows flowchart 650 illustrating method of use 600, as discussed subsequently.)

Melon peeler systems 100 according to an embodiment of the present invention of FIGS. 1-5 may comprise kit 540. Kit 540 may comprise the following parts: melon peeler assembly 110; tiered fruit arrangement and display assembly 410; and at least one skewer holder 510. Tiered fruit arrangement and display assembly 410 preferably comprises at least one large platter 400 and at least one small platter 500. Tiered fruit arrangement and display assembly 410, and at least one skewer holder 510 are suitable for displayably-holding melon hors d'oeuvres. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different platter/skewer combinations, use of different knife or knife combinations, and parts may be sold separately may be considered to be suitable equivalents within the scope of the present invention.

Figure 6:
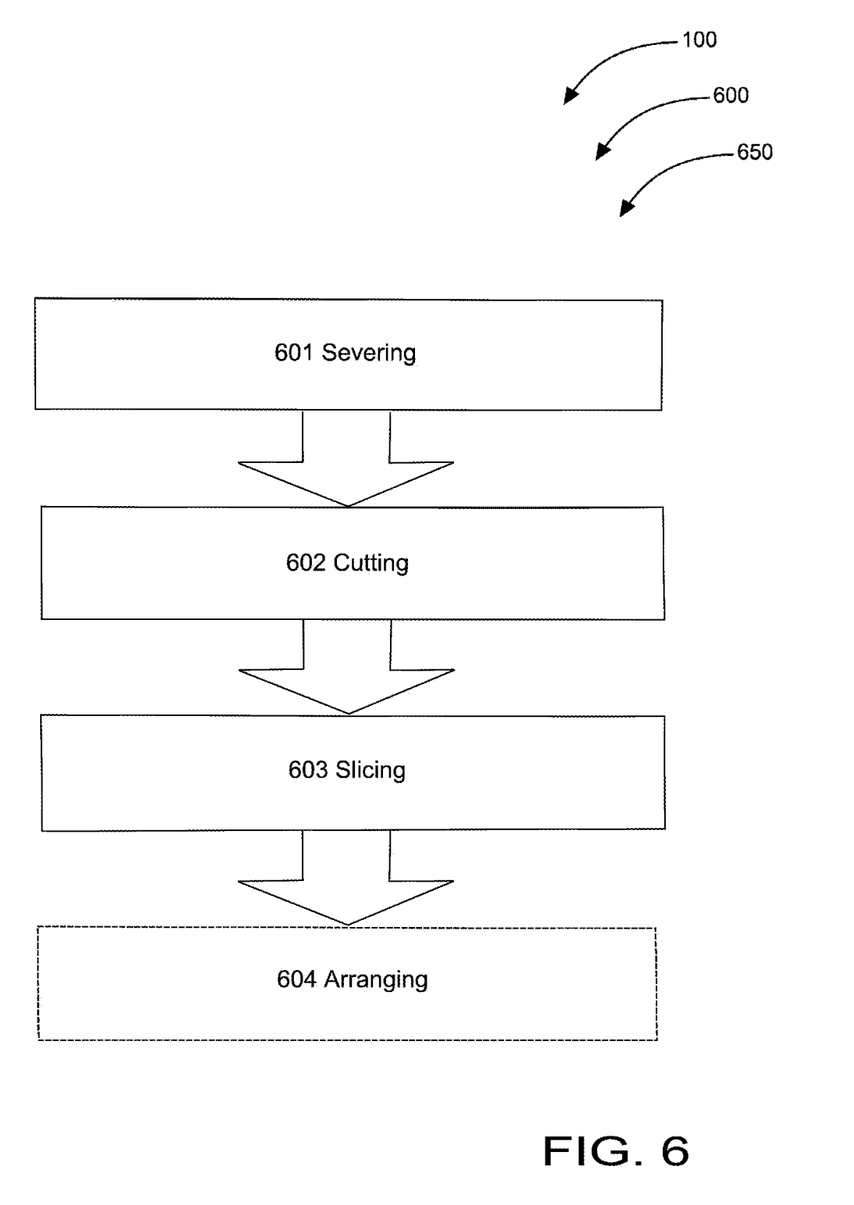
FIG. 6 is a flowchart illustrating a method of use for the melon peeler system(s) according to an embodiment of the present invention of FIGS. 1-5.

Referring now to FIG. 6. showing flowchart 650 illustrating method of use 600 according to embodiment(s) of the present invention of FIGS. 1-5. A method of using (at least herein enabling method of use 600) melon peeler systems 100 may comprise the steps of: step one 601 severing melon 160 into wedges 162; step two 602 manually cutting at least one wedge 162 of melon 160 using melon peeler assembly 110, (wedge 162 of melon 160 oriented with rind side 166 facing downwardly and flesh side 170 facing upwardly, wherein the cutting is accomplished using horizontal blade 130, wedge 162 of melon 160 is push-moved along an arc on guide 128 surface on concave base 120 of melon peeler assembly 110, wedge 162 coming into cutting contact with horizontal blade 130, horizontal blade 130 then passing between rind 164 and flesh 168 while being pull-moved by user 180 to cut melon 160, thereby removing rind side 155 from flesh side 170); step three 603 may comprise slicing flesh 168 into melon hors d'oeuvres; and step four 604 includes arranging the melon hors d'oeuvres within tiered fruit arrangement and display assembly 410 and/or on skewer holder(s) 510, the melon hors d'oeuvres forming an aesthetic comestible.

It should be noted that step 604 is an optional step and may not be implemented in all cases. Optional steps of method 600 are illustrated using dotted lines in FIG. 6 so as to distinguish them from the other steps of method 600. It should be further noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, using different displaying means, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A melon peeler assembly comprising:
   a concave base;
   at least one horizontal blade;
   at least one fastener;
   wherein said concave base comprises a smooth surface and serves as a guide;
   wherein said horizontal blade is supported a user-determined distance above said concave base;
   wherein said horizontal blade is adjustable;
   wherein said fasteners are removable and are used to provide stability, when attached, such that said melon peeler assembly is securely affixable to a planar surface;
   wherein said melon peeler assembly receives a wedge of a melon pushed by a user into cutting contact with said horizontal blade, said melon having a rind and a flesh, said rind having a rind side, said flesh having a flesh side, said melon oriented with said rind side facing downwardly and said flesh side facing upwardly; and
   wherein said wedge of said melon is manually pushed against and pulled across said horizontal blade to separate said rind from said flesh.

2. The melon peeler assembly of claim 1 wherein said at least one fastener comprises suction cup(s).

3. The melon peeler assembly of claim 1 wherein said planar surface comprises a table surface.

4. The melon peeler assembly of claim 1 wherein said planar surface comprises a countertop.

5. The melon peeler assembly of claim 1 wherein said concave base comprises plastic.

6. The melon peeler assembly of claim 1 wherein said guide of said concave base is a smooth surface that conforms to an outer curvature of said melon such that a uniform cutting action is able to be accomplished separating said rind from said flesh of said melon as said melon is pushed against and then pulled across said horizontal blade.

7. The melon peeler assembly of claim 1 further comprising vertical supports.

8. The melon peeler assembly of claim 7 wherein said vertical supports comprise a plurality of notches.

9. The melon peeler assembly of claim 8 wherein said vertical supports support said horizontal blade within said notches.

10. The melon peeler assembly of claim 9 wherein said notches provide a means for selecting a user-determined distance whereby said horizontal blade may be increased or decreased in distance relative to and fro said concave base.

11. The melon peeler assembly of claim 10 wherein said distance between said horizontal blade and said concave base determines a peel thickness of said rind when removed from said flesh.

12. The melon peeler assembly of claim 10 wherein said distance between said horizontal blade and said concave base, as determined by placement of said horizontal blade in said notches allows different size said wedges of said melon to be cut during a cutting action.

13. The melon peeler assembly of claim 1 wherein said horizontal blade comprises stainless steel.

14. The melon peeler assembly of claim 13 wherein said horizontal blade comprises a small, flat cutting edge sufficiently sharp to slice through said melon but not sufficiently sharp to cut said user.

15. The melon peeler assembly of claim 14 wherein said horizontal blade of said melon peeler assembly is usable to cut said flesh of said melon after said rind is removed from said flesh to create strips and shapes of said melon at desired thicknesses.

16. A melon peeler system comprising:
   a melon peeler assembly having,
      a concave base,
      at least one horizontal blade,
      at least one fastener, and
      vertical supports;
   wherein said concave base comprises a smooth surface and serves as a melon cutting guide;
   wherein said horizontal blade is supported a user-determined distance above said concave base by said vertical supports;
   wherein said horizontal blade is horizontally-oriented in said vertical supports in relation to said concave base and vertically adjustable from said concave base within said vertical supports;
   wherein said horizontal blade comprises stainless steel, said horizontal blade comprising a small, flat cutting edge sufficiently sharp to slice through a melon but not sufficiently sharp to easily cut a user;
   wherein said vertical supports comprise a plurality of notches;

wherein said notches define a parallel distance of said horizontal blade from a planar surface;

wherein said vertical supports frictionally support said horizontal blade within said notches;

wherein said notches provide a means for selecting a user-determined distance whereby said user-determined distance of said horizontal blade may be increased or decreased relative to said concave base;

wherein said distance between said horizontal blade and said concave base determines a peel thickness of a rind when removed from a flesh of said melon;

wherein said distance between said horizontal blade and said concave base, as determined by placement of said horizontal blade in said notches allows different size wedges of said melon to be cut during a cutting action;

wherein said at least one fastener comprises suction cup(s);

wherein said fasteners comprise four of said suction cups, said suction cups being removable from said planar surface;

wherein said suction cups are used to provide stability such that said melon peeler assembly may be securely affixed to at least one said planar surface, removed and re-affixed to said at least one planar surface or to another planar surface;

wherein said planar surface comprises a table surface;

wherein said another planar surface comprises a countertop;

wherein said guide of said concave base conforms to an outer curvature of said melon such that a uniform cutting action is accomplished when said melon peeler assembly receives a wedge of said melon pushed by said user into cutting contact with said horizontal blade, said wedge of said melon including said rind and said flesh separable by said horizontal blade, said wedge of said melon oriented with an outer surface of said rind facing downwardly and said flesh facing upwardly;

wherein said wedge of said melon is pushed against and then pulled across said horizontal blade to separate said rind from said flesh; and wherein said horizontal blade of said melon peeler assembly is further usable to cut said flesh of said melon after said rind is removed from said flesh to create strips and shapes of said melon at desired thicknesses, said melon forming an aesthetic comestible.

17. The melon peeler system of claim 16 further comprising a kit, said kit including said melon peeler assembly; a tiered fruit arrangement and display assembly; and at least one skewer holder.

18. The melon peeler system of claim 17 wherein said tiered fruit arrangement and display assembly comprises at least one large platter and at least one small platter.

19. The melon peeler system of claim 17 wherein said tiered fruit arrangement and display assembly, and said at least one skewer holder are suitable for displayably-holding melon hors d'oeuvres.

20. A method of using a melon peeler system comprising the steps of:

severing a melon into wedges;

manually cutting at least one wedge of said melon using a melon peeler assembly, said wedge of said melon oriented with a rind side facing downwardly and a flesh side facing upwardly, wherein said cutting is accomplished using a horizontal blade, said wedge of said melon is push-moved along an arc on a guide surface on a concave base of said melon peeler assembly, said wedge coming into cutting contact with said horizontal blade, said blade then passing between a rind and a flesh while being pull-moved by said user to cut said melon, thereby removing said rind side from said flesh side;

slicing said flesh of said melon further into melon hors d'oeuvres; and arranging said melon hors d'oeuvres within a tiered fruit arrangement and display assembly and/or on skewer holder(s), said melon hors d'oeuvres forming an aesthetic comestible for consumption.

* * * * *